United States Patent
Coronel et al.

(10) Patent No.: US 7,969,300 B2
(45) Date of Patent: *Jun. 28, 2011

(54) SIGNAL TRANSMISSION BETWEEN A SENSOR AND A CONTROLLER DEVICE IN A WIRELESS SENSOR NETWORK

(75) Inventors: Pedro E. Coronel, Thalwil (CH); Simeon Furrer, Mountain View, CA (US); Wolfgang H. Schott, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 254 days.

This patent is subject to a terminal disclaimer.

(21) Appl. No.: 12/045,194

(22) Filed: Mar. 10, 2008

(65) Prior Publication Data

US 2008/0164996 A1     Jul. 10, 2008

Related U.S. Application Data

(63) Continuation of application No. 11/214,317, filed on Aug. 29, 2005, now Pat. No. 7,378,953.

(30) Foreign Application Priority Data

Aug. 30, 2004   (EP) .................................. 04020534

(51) Int. Cl.
   *G08B 1/08*   (2006.01)
(52) U.S. Cl. ............... 340/539.1; 340/870.01; 343/757; 455/69
(58) Field of Classification Search ............... 340/539.1, 340/10.1, 870.01, 539.21; 455/67.11, 69, 455/452.2, 450, 63.4; 370/349, 389, 310, 370/338; 343/757
See application file for complete search history.

(56) References Cited

U.S. PATENT DOCUMENTS

| | | | |
|---|---|---|---|
| 6,801,514 B2 | 10/2004 | Ma | |
| 7,304,976 B2 | 12/2007 | Mao et al. | |
| 7,378,953 B2 * | 5/2008 | Coronel et al. | ............ 340/539.1 |
| 2002/0045428 A1 | 4/2002 | Chesson | |
| 2003/0214411 A1 | 11/2003 | Walter et al. | |
| 2004/0106436 A1 | 6/2004 | Ochi et al. | |
| 2004/0114535 A1 | 6/2004 | Hoffmann et al. | |
| 2005/0032516 A1 | 2/2005 | Marchevsky | |
| 2005/0058075 A1 | 3/2005 | Gorday et al. | |
| 2005/0064871 A1 | 3/2005 | Kawasaki et al. | |
| 2005/0070294 A1 | 3/2005 | Lyle et al. | |
| 2005/0094585 A1 | 5/2005 | Golden et al. | |
| 2005/0128988 A1 | 6/2005 | Simpson et al. | |
| 2005/0146470 A1 | 7/2005 | Li et al. | |
| 2006/0087423 A1 | 4/2006 | Coronel et al. | |

OTHER PUBLICATIONS

P. Coronel et al. "An Opportunistic Energy-Efficient Medium-Access Scheme for Wireless Sensor Networks", Proceedings of IEEE International Conference on Communications, May 2004.

P. Viswanath et al. "Opportunistic Beamforming Using Dumb Antennas", IEEE Transactions on Information Theory, vol. 48, No. 6, Jun. 2002, pp. 1277-1294.

* cited by examiner

*Primary Examiner* — Brent Swarthout
(74) *Attorney, Agent, or Firm* — John E. Campbell

(57) ABSTRACT

A wireless sensor network includes a controller connected with multiple antennas for sending out a beacon signal at different instants into different directions and for receiving a sensor signal. Furthermore, the wireless sensor network comprises a sensor having a receiver connected with a sensor antenna for receiving the beacon signal, a transmitter connected with the sensor antenna for sending out the sensor signal, and a control unit which takes care that the sensor signal is transmitted after the beacon signal has been received.

12 Claims, 5 Drawing Sheets

# SIGNAL TRANSMISSION BETWEEN A SENSOR AND A CONTROLLER DEVICE IN A WIRELESS SENSOR NETWORK

CROSS-REFERENCE TO RELATED APPLICATIONS

This is a continuation of U.S. patent application Ser. No. 11/214,317 "Transmission Between a Sensor and a Controller in A Wireless Sensor Network" filed Aug. 29, 2005 now U.S. Pat. No. 7,378,953 and assigned to IBM. The disclosure of the forgoing application is incorporated herein by reference.

TECHNICAL FIELD

The present invention relates to a wireless sensor network, a wireless controller, a wireless sensor, a method for transmission of signals between the sensor and the controller in the wireless sensor network, a method for operating the controller in the wireless sensor network, a method for transmitting a sensor signal in the wireless sensor network from the sensor to the controller and computer program elements for performing the steps according to the methods.

BACKGROUND OF THE INVENTION

In general, a wireless sensor network (WSN) consists of a set of sensor nodes S1, S2, . . . SK which are centrally controlled by means of a central controller C, which in the following is also referred to as WSN controller. The sensor nodes S1, S2, . . . SK are deployed over a geographical area. Each sensor or sensor node S1, S2, . . . SK by measurement collects information about a physical phenomenon and forwards its measurement result via a wireless link to the WSN controller C for further processing. Since the costs of the sensor nodes S1, S2, . . . SK should be reduced and the sensor nodes are usually powered by batteries, the sensor design should aim to reduce the implementation complexity and the power consumption. The central controller C, however, does not have the same limitations on cost and power. Therefore, in order to enhance the performance of a WSN, methods and functions should be identified that can mainly be implemented at the central controller C and avoid increasing the complexity of sensor nodes S1, S2, . . . SK.

R. Laroia, P. Visawanath, and D. Tse have described in "Opportunistic beamforming using dumb antennas", IEEE Trans. Inform. Theory, vol. 48, pp. 1277-1294, 2002, the concept of opportunistic beamforming with dumb antennas for the downlink in a cellular mobile communication system for exploiting multi-user diversity and suppressing adjacent cell interference. The scheme uses multiple antennas at the basestation to transmit the same signal from each antenna modulated by a complex gain whose value is changing in a controlled, but random fashion. Each mobile user measures the signal-to-interference-plus-noise ratio (SINR) by tracking a pilot signal that is repeatedly radiated at the transmit antennas of the basestation. All mobile users feed back their measurements to the basestation which analyzes the fed-back SINRs values in order to form a rule for efficiently scheduling a downlink message transfer to the mobile users.

SUMMARY OF THE INVENTION

Therefore, a general aspect of the invention is to provide a wireless sensor network, a wireless controller, a wireless sensor, a method for wireless data transfer between a sensor and a controller in the wireless sensor network, and a method for operating the controller wherein the battery energy consumption in the sensor is reduced. Moreover, the network and method according to the invention can be implemented with a reduced signaling overhead, i.e. the media access control (MAC) protocol overhead can be reduced.

According to an embodiment of the invention, the aspect is achieved by a wireless sensor network. The wireless sensor network comprises a controller connected with multiple antennas for sending out a beacon signal at different instants into different directions and for receiving a sensor signal. Furthermore, the wireless sensor network comprises a sensor having a receiver connected with a sensor antenna for receiving the beacon signal, a transmitter connected with the sensor antenna for sending out the sensor signal, and a control unit which takes care that the sensor signal is transmitted after the beacon signal has been received.

According to another aspect of the invention, a wireless controller for one or more wireless sensors comprises a transmitter connected with multiple antennas for broadcasting a beacon signal in a determined direction when the controller is in broadcast mode, and a receiver connected with the multiple antennas for receiving a sensor signal from this determined direction from one of the wireless sensors when the controller is in receive mode. The wireless controller further comprises a signal generator formed such that it takes care that the transmitter broadcasts the beacon signal in another direction, when the controller is switched again to broadcast mode. The wireless controller can switch back and forth between receive mode and broadcast mode.

According to another aspect of the invention, the invention provides a method for operating a controller in a wireless sensor network having one or more sensors. According to still another aspect of the invention, the invention provides a method for transmitting a sensor signal in a wireless sensor network from a sensor to a controller.

BRIEF DESCRIPTION OF THE DRAWINGS

The invention and its embodiments will be more fully appreciated by reference to the following detailed description of illustrative embodiments in accordance with the present invention when taken in conjunction with the accompanying drawings, in which.

DETAILED DESCRIPTION OF THE INVENTION

Figure 1:
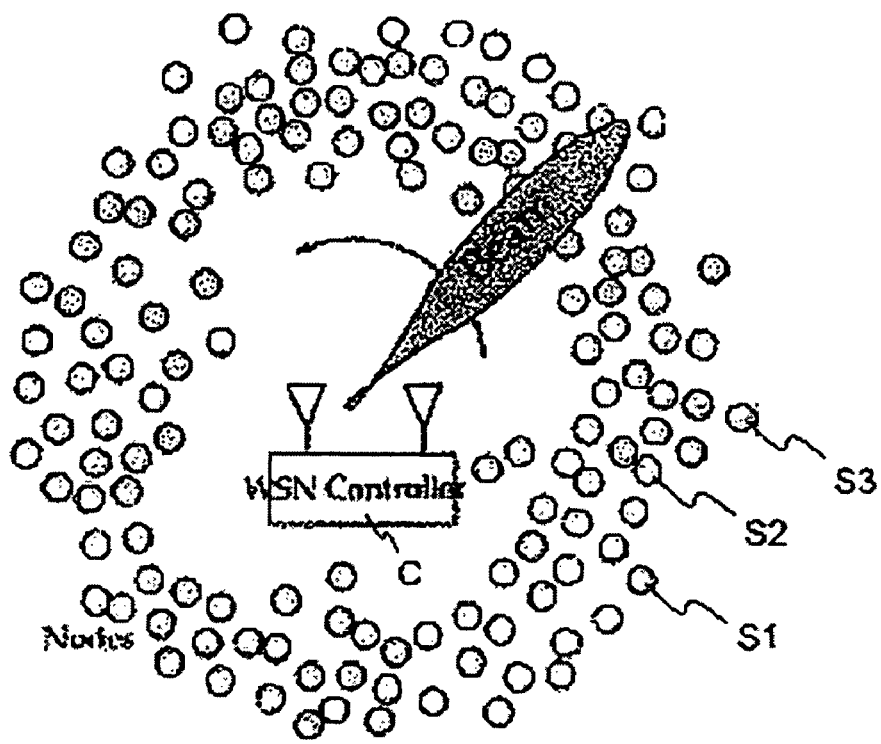
FIG. 1 shows a model of a wireless sensor network according to the invention.

The present invention provides a wireless sensor network, a wireless controller, a wireless sensor, a method for wireless data transfer between a sensor and a controller in the wireless sensor network, and a method for operating the controller wherein the battery energy consumption in the sensor is reduced. Moreover, the network and method according to the invention can be implemented with a reduced signaling overhead, i.e. the media access control (MAC) protocol overhead can be reduced.

In an example embodiment, the invention provides a wireless sensor network with the features described below. The wireless sensor network includes a controller connected with multiple antennas for sending out a beacon signal at different instants into different directions and for receiving a sensor signal. The wireless sensor network further comprises a sensor having a receiver connected with a sensor antenna for receiving the beacon signal, a transmitter connected with the sensor antenna for sending out the sensor signal, and a control unit which takes care that the sensor signal is transmitted after the beacon signal has been received.

In another example embodiment, the invention provides a wireless controller for one or more wireless sensors. The wireless controller for one or more wireless sensors comprises a transmitter connected with multiple antennas for broadcasting a beacon signal in a determined direction, when the controller is in broadcast mode, and a receiver connected with the multiple antennas for receiving a sensor signal from this determined direction from one of the wireless sensors, when the controller is in receive mode. The wireless controller further comprises a signal generator formed such that it takes care that the transmitter broadcasts the beacon signal in another direction, when the controller is switched again to broadcast mode. The wireless controller can switch back and forth between receive mode and broadcast mode.

In another example embodiment, the invention provides a wireless sensor including a receiver connected with a sensor antenna for receiving a beacon signal from a wireless controller, a detecting unit for detecting the beacon signal, a sensing unit for sensing a physical quantity and generating therefrom a sensor signal, and a transmitter connected to the sensor antenna for sending the sensor signal to the wireless controller.

In another example embodiment, the invention provides a method for signal transmission between a sensor and a controller in a wireless sensor network. The method for transmission between a sensor and a controller in a wireless sensor network comprises the following steps. First, the controller broadcasts a beacon signal in a determined direction and the sensor listens whether the beacon signal is available and if this is the case the sensor sends the sensor signal to the controller. After the controller has broadcasted the beacon signal it listens whether a sensor signal is available from this direction, and if this is the case the controller receives the sensor signal. Afterwards the controller broadcasts the beacon signal in another direction, and then listens again whether a sensor signal is available.

In another example embodiment, the invention provides a method for operating a controller in a wireless sensor network having one or more sensors. The method for operating a controller in a wireless sensor network having one or more sensors comprises the following steps. A beacon signal is broadcasted in a determined direction by means of the controller, and afterwards the controller is listening whether a sensor signal from one of the sensors can be received from this direction, and if this is the case it receives the sensor signal. Finally, the controller broadcasts the beacon signal in another direction and listens again whether a sensor signal from one of the sensors can be received.

In another example embodiment, the invention provides a method for transmitting a sensor signal in a wireless sensor network from a sensor to a controller with the features of the independent claim 12. The method for transmitting a sensor signal in a wireless sensor network from a sensor to a controller comprises the following steps. The sensor is listening whether a beacon signal from the controller is available, and if this is the case the sensor sends the sensor signal to the controller.

In another example embodiment, the invention provides a computer program element comprising computer program code for performing steps according to the above mentioned method when loaded in a digital processor of the controller. Finally, the aspect is also achieved by a computer program element comprising computer program code for performing steps according to the above mentioned method when loaded in a digital processor of the sensor.

In an embodiment of the wireless sensor network according to the invention the controller comprises a random generator which takes care that the direction into which the beacon signal is send out is randomly selected. In a further embodiment of the wireless sensor network according to the invention the sensor comprises a detecting unit for detecting the beacon signal. In a still further embodiment of the wireless sensor network according to the invention the beacon signal comprises an end-of-beacon symbol.

In the wireless controller according to the invention the signal generator can be formed such that the directions into which the beacon signal is broadcasted are determined randomly. The wireless sensor according to the invention can also comprise a sensor control unit which is formed such that it takes care that the sensor signal is transmitted after an end-of-beacon symbol in the beacon signal is detected.

It is advantageous in the method for transmission according to the invention to transmit the sensor signal after an end-of-beacon symbol in the beacon signal is detected from the sensor. In an embodiment of the method for transmitting data according to the invention the sensor starts sending the sensor signal to the controller when the sensor has detected the end of the beacon symbol. In another embodiment of the method for transmitting the sensor signal according to the invention the sensor stays in an energy save mode, also referred to as sleep mode, until the sensor signal is transmitted to the controller. Advantageously, in the method for transmitting the sensor signal according to the invention the beacon signal is considered to be available if a channel quality indicator of the received signal exceeds a certain threshold value. In an advantageous application of the method for transmitting the sensor signal according to the invention the signal-to-noise-ratio is used as channel quality indicator. Additional objects and advantages of the invention will be set forth in the description which follows, and may be learned by practice of the invention.

Figure 3:
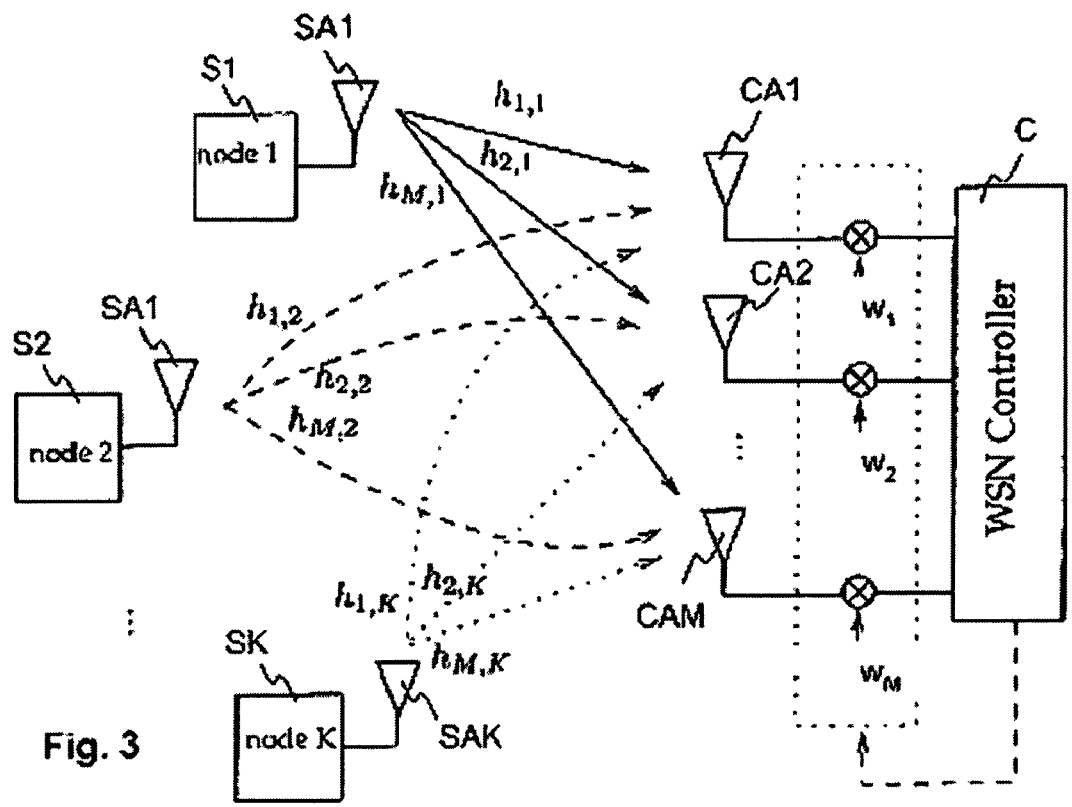
FIG. 3 shows a system model of the wireless sensor network in more detail.

Hereinafter, an opportunistic multiple-access scheme for controlling the uplink message transfer from sensor nodes S1, S2, . . . SK to a central controller C in a wireless sensor network as shown in FIG. 3 is described. By equipping the controller C with multiple antennas CA1, . . . CAM to communicate with preferably single-antenna sensors S1, S2, . . . SK, a scheme is specified that benefits from diversity reception at the controller C and leads to a reduction of power consumption in sensor nodes S1, S2, . . . SK. This automatically translates into a longer life-time of sensor batteries. The benefit for the sensor nodes S1, S2, . . . SK stems from diversity reception at the controller C, e.g., from simultaneously receiving and processing signals that are received by multiple antennas CA1, . . . CAM, wherein the processing of the signals is described further below. The channel coefficients $h_{1,1} \ldots h_{M,K}$ and the weights $w_1 \ldots wM$ will also be described further below. Moreover, the proposed technique can be implemented with a reduced signaling or protocol overhead. The performance of the scheme is assessed using a Rayleigh fading channel model.

The basic concept of the described scheme is illustrated by means of FIG. 1. It shows a sensor deployment area comprising numerous sensors, e.g., S1, S2, S3 and a central WSN controller C equipped with multiple antennas. The controller C, also referred to as control node, can form a beam that sweeps in an iterative, pseudo-random fashion across the whole deployment area. The beam is hence a beacon signal that is sent out at different instants into different directions. Beam forming can be performed by weighting the signals radiated at each antenna of the controller C with complex weights specifying a distinct phase or amplitude shift in the antenna spectrum. The sensors S1, S2, S3, also referred to as sensor nodes, under the beam will receive the beacon signal from the controller C when it works in downlink-broadcast mode with a larger signal-to-noise ratio (SNR) than those sensors S1, S2, S3 which are not under the beam. Since the channel reciprocity principle is valid for a wireless channel, the same statement is also true for the uplink-transmission mode. Therefore, the sensor nodes S1, S2, S3 that transmit while covered by the beam will achieve better receive SNRs than other sensors S1, S2, S3, at the same energy consumption. The power consumption in the sensor nodes S1, S2, S3 can thus be reduced by scheduling the message transfer in the uplink-transmission mode if the sensor S1, S2, S3 is covered by the beam. Due to the validity of the reciprocity principle, the sensor nodes S1, S2, S3 can detect beam coverage by continuously measuring the received SNR or any other channel quality indicator (CQI) of a beacon signal that is repeatedly transmitted by the controller C. By comparing this measurement to a threshold that can be set, for example, based on previously monitored and averaged SNR values, the sensors S1, S2, S3 can determine independently when it is opportune to send a message, also referred to as sensor signal, to the controller C at a reduced signal power. The scheme is termed as opportunistic because the sensors S1, S2, S3 under the beam will take advantage of sufficient channel conditions as they arise, wherein the channel conditions are considered to be sufficient if the channel coefficients h are sufficiently close to the weights was described further below in equation 13A sensor S1, S2, S3 does not require a SNR measurement made by any other sensor S1, S2, S3 or the controller C to make the decision for initializing a message transfer.

In the following more details on the proposed multiple access scheme are given. In section "Opportunistic Multiple Access Scheme", the technique is described from the point of view of a medium-access control (MAC) protocol. Section "Theoretical Foundation" states the theoretical arguments on which this technique is based.

Opportunistic Multiple Access Scheme

Figure 2:
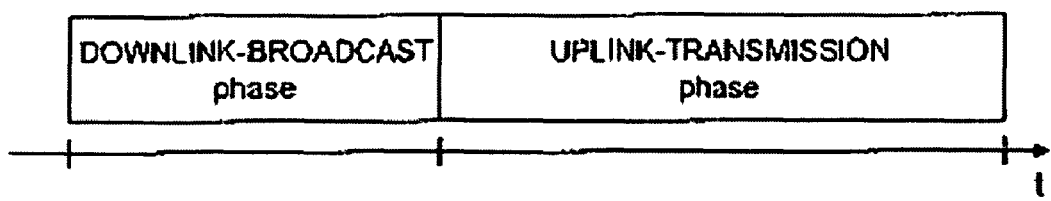
FIG. 2 shows time phases of a MAC protocol, which is implemented partly in the sensors and partly in the controller of the wireless sensor network.
Figure 6:
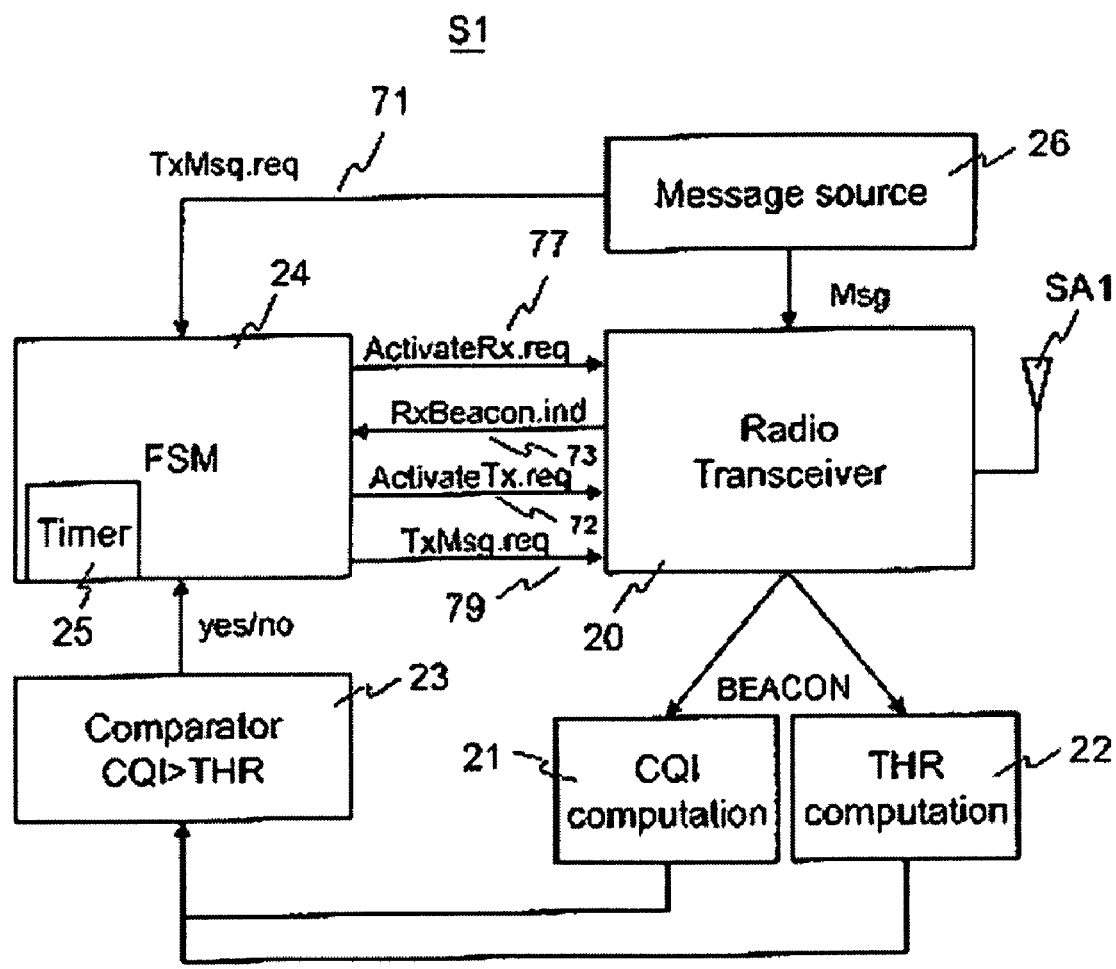
FIG. 6 shows a block diagram depicting the architecture of one of the wireless sensors.

The provided opportunistic multiple access scheme includes some functions in the MAC protocol that is implemented partly in the sensors and partly in the WSN controller. The MAC finite state machine (FSM) 12 implemented in the WSN controller C switches repeatedly, but not necessarily periodically between the two states or phases DOWNLINK-BROADCAST and UPLINK-TRANSMISSION (see FIG. 2). The DOWNLINK-BROADCAST phase should be short, but long enough to allow estimation of the SNR at the radio receiver 20 in the sensor S1 (FIG. 6). To ensure an efficient throughput, the UPLINK-TRANSMISSION phase should be longer; however, the length of this UPLINK-TRANSMISSION phase is also limited by the assumption that fading effects should not substantially change the channel characteristic during a single combined DOWNLINK-BROADCAST/UPLINK-TRANSMISSION phase.

Figure 4:
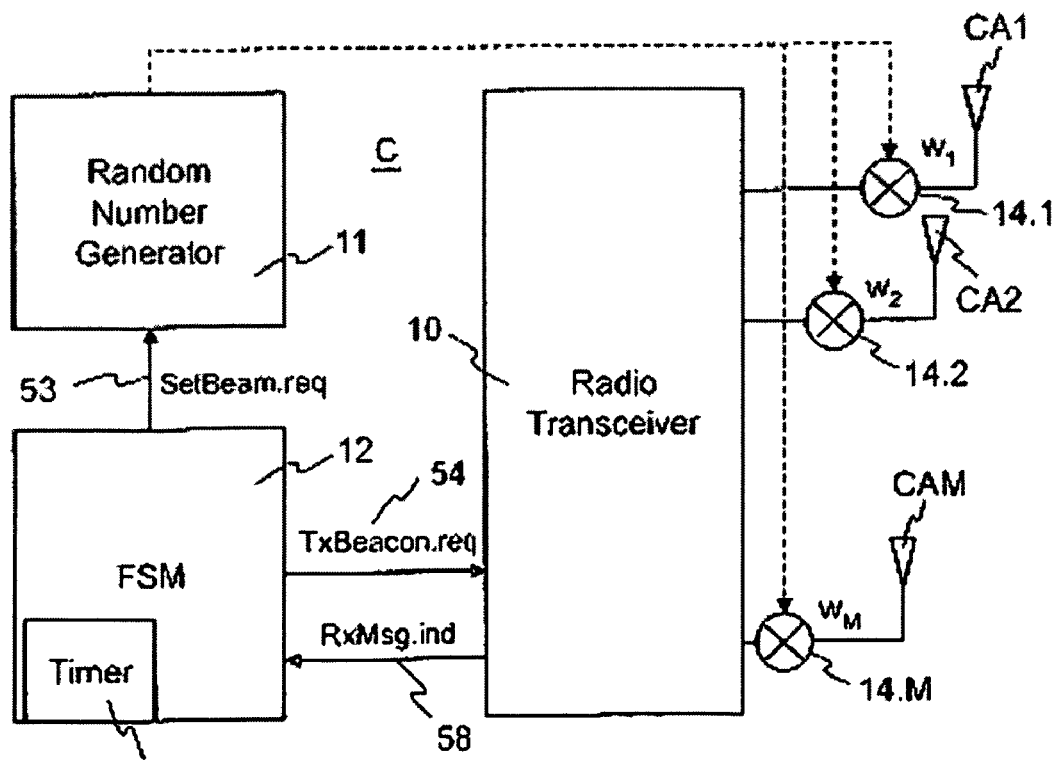
FIG. 4 shows a block diagram depicting the architecture of the wireless controller with multiple antennas.

In the following the expression transceiver is used for a combination of transmitter and receiver. In FIG. 4 the architecture of the wireless controller C with multiple antennas CA1 ... CAM is shown. The FSM 12 comprises a timer 13 for controlling a first time period T1 and a second time period T2. Furthermore, a random number generator 11 is present in the controller C. The random number generator 11 is also referred to as random generator or signal generator and is responsible for generating randomly the weights w1, ... wM. Using multipliers 14.1, 14.2 ... 14.M, the signal posteriorily transmitted on each antenna CA1, ... CAM will be multiplied by the corresponding weight or complex coefficient w1, ... wM. This operation is performed upon the request SetBeam.req 53 of the FSM 12. The controller C also comprises a radio transceiver 10 for receiving or transmitting signals via the antennas CA1 ... CAM. The FSM 12 can request the radio transceiver 10 to transmit the beacon signal by issuing the request TxBeacon.req 54. The radio transceiver 10 indicates the FSM 12 whether a message has been received by the indication RxMsg.ind 58.

Figure 5:
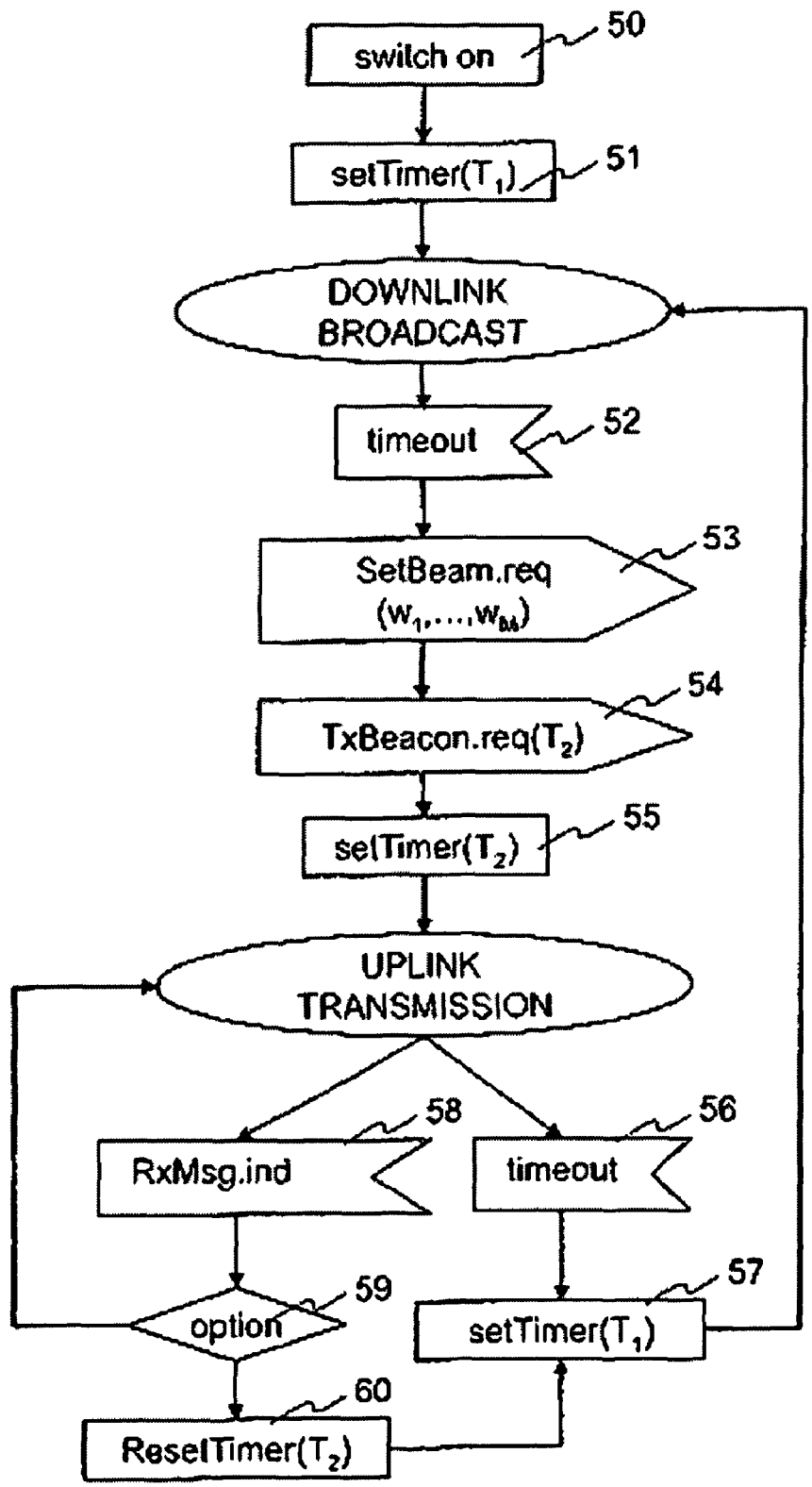
FIG. 5 shows a flow diagram of the protocol running on the wireless controller.

The behavior of FSM 12 is shown in FIG. 5. The state DOWNLINK-BROADCAST, also referred to as broadcast mode, is entered for the first time when the controller C is switched on (see reference sign 50 in FIG. 5) and the timer 13 has been set to the duration of the first time period T1 (see reference sign 51). In the state DOWNLINK-BROADCAST and upon the timeout 52 of the timer 13, the FSM 12 issues a request 53 to the random number generator 11, which randomly chooses a new antenna beam by drawing a set of random complex coefficients w1, w2 ... wM and configuring the radio transceiver 10 so that the signals to be radiated at each antenna CA1, CA2, ... CAM are weighted with a corresponding complex coefficient w1, w2 ... wM via the multipliers 14.1, 14.2, ... 14.M. After the beam has been formed, the FSM 12 issues a request 54 to the radio transceiver 10. Then, the radio transceiver 10 broadcasts into the determined direction of the beam a beacon signal. The beacon carries symbols for identifying the channel quality and detecting "end-of-beacon" at the radio transceiver 20 of a sensor S1. After the beacon signal has been sent and the timer 13 has been set to the duration of the second time period T2 (see reference sign 55), the FSM 12 transits to a state UPLINK-TRANSMISSION, also referred to as receive mode. Hence, the FSM 12 switches from the broadcast mode to the receive mode. Without changing the beam forming of the antennas CA1, CA2, ... CAM, the transceiver 10 starts listening to the radio channel, waiting for a sensor message Msg. If a sensor message Msg has been detected and received within the predefined timespan T2, the radio transceiver 10 informs the FSM 12 by issuing the indication RxMsg.ind 58. The FSM 12 of the controller C has two options 59: either it returns to state DOWNLINK-BROADCAST after resetting the timer T2 (see reference sign 60) and setting the timer corresponding to the first time period T1 (see reference sign 57), or it stays in state UPLINK-TRANSMISSION until the timeout of the timer occurs (see reference sign 56). If no sensor message Msg has been detected, the expiration of the timer in step 56 leads to a transition from the UPLINK-TRANSMISSION phase to the DOWNLINK-BROADCAST phase after setting the timer to the first time period T1 (see reference sign 57). Hence, the FSM 12 switches from the receive mode to the broadcast mode.

In the following the architecture and functional principle of the wireless sensor nodes S1 to SK is described with the sensor S1, but the description is analogously also valid for each of the sensors S2 to SK. In FIG. 6 the architecture of the sensor node S1 is depicted. The FSM 24 comprises a timer 25 for controlling a time period T2. The sensor node S1 comprises a message source unit 26, also referred to as sensing unit, which measures a physical quantity, therefrom produces the sensor message Msg to be transmitted and notifies the FSM 24 by issuing the notification TxMsg.req 71 that a sensor message Msg is pending. The FSM 24 issues a request ActivateRx.req 72 to activate the receiver of the radio transceiver 20 which, by using its antenna SA1, senses the medium for an incoming beacon. Upon reception of a beacon signal, the radio transceiver 20 informs the FSM 24 with a message RxBeacon.ind 73. The FSM 24 issues a request ActivateTx.req 77 to activate the transmitter of the radio transceiver 20. The radio transceiver 20 passes the beacon signal to a CQI computation unit 21 and to a THR computation unit 22. Those units 21 and 22 will respectively produce the metrics CQI and THR, which will be passed to a comparator 23. The units 21, 22 and 23 are hereinafter also called detecting unit. Depending on the output (yes or no) of the comparator 23, the FSM 24 will issue a transmission request TxMsg.req 79 to the transmitter of the radio transceiver 20.

Figure 7:
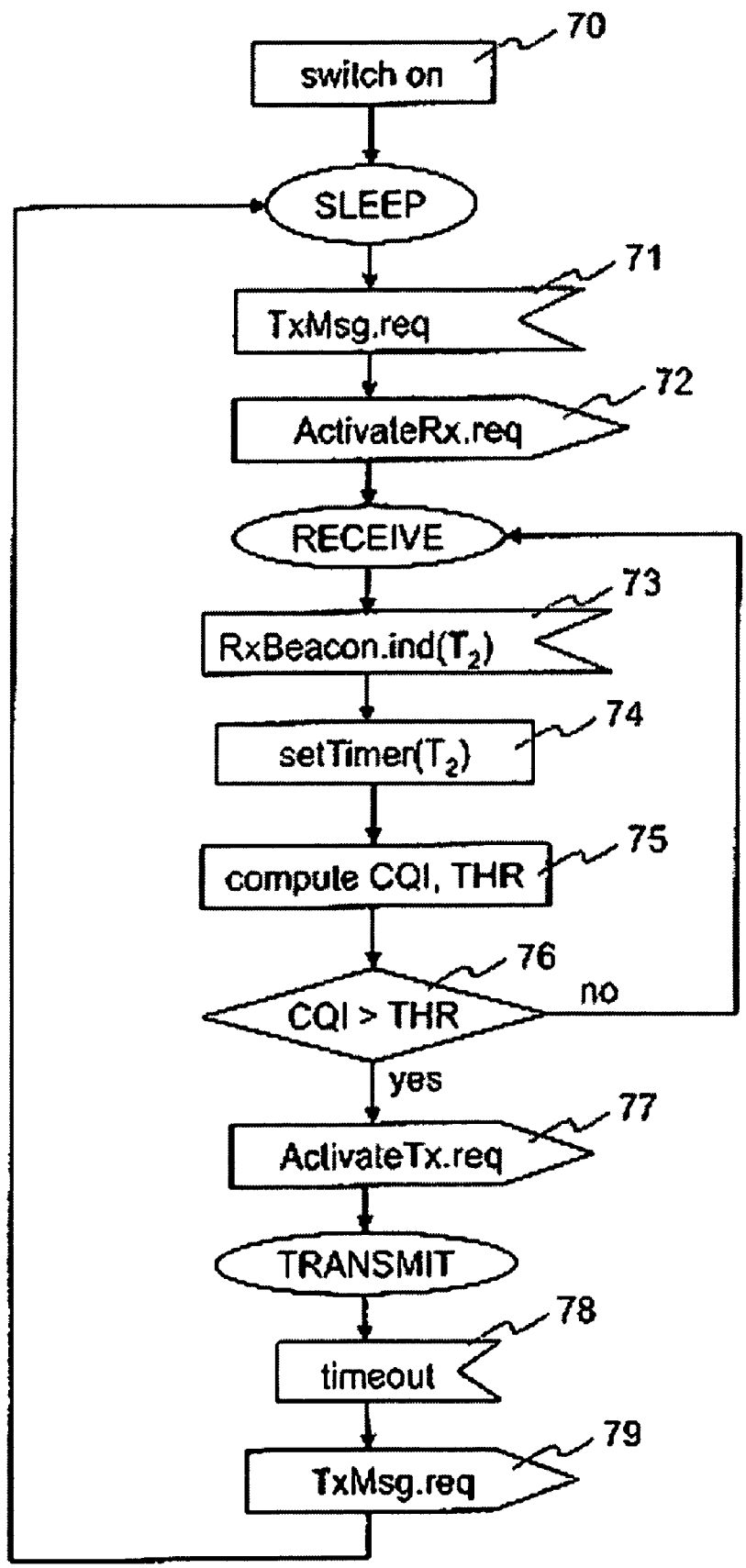
FIG. 7 shows a flow diagram of the protocol running on the wireless sensors.

As depicted in FIGS. 6 and 7 the FSM 24 implemented in the wireless sensor S1 comprises the states SLEEP, RECEIVE, and TRANSMIT. When the sensor S1 is switched on (see reference sign 70), the sensor node S1 is in the sleep mode SLEEP, also referred to as energy save mode, that is, the radio transceiver 20 is powered down in order to reduce dissipation of battery energy. When a message transfer request TxMsg.req 71 has been raised, the FSM 24 activates the receiver of the radio transceiver 20 by issuing a request ActivateRx.req 72 and enters the state RECEIVE. The sensor S1 listens to the radio channel and waits for receiving a predefined, beacon signal transmitted by the controller C. If a beacon signal has been recognized, the radio transceiver 20 informs the FSM 24 by issuing an indication RxBeacon.ind (T2) 73. The timer 25 is set to the second time period T2 74 as passed by the beacon signal in step 73. Then in step 75 the metric CQI, e.g. the SNR, is computed and in step 76 compared to a decision threshold THR. If the metric CQI is not larger than the decision threshold THR a NO is issued at the output of the comparator 23, the FSM 24 returns to state RECEIVE. In case the comparator 23 issues a YES at its output, the sensor S1 transits to state TRANSMIT after activating the transmitter of the radio transceiver 20 with message ActivateTx.req 77. After the timeout 78, the FSM 24 issues the request TxMsg.req 79 to the radio transceiver 20 to transmit the sensor message Msg. After the sensor message Msg has been sent, the FSM 24 of the sensor S1 returns to state SLEEP.

The decision rule, or more specifically the decision threshold THR to be set in the MAC FSM 24 of the sensor S1, depends on the statistics of the wireless channel. If the channel can be modeled by the Rayleigh slow-fading channel model, a Maximum Likelihood (ML) rule is proposed to be implemented to decide whether the sensor node S1 should transmit or not. In Section "Theoretical Foundation", it will be shown that, firstly, the decision to transmit only under sufficient channel conditions can be based on the estimated SNR and, secondly, how to derive the decision threshold THR for this particular statistical channel model. Other suboptimal, but more practical strategies to set the threshold THR are conceivable. For example, the SNR values monitored during previous broadcast phases can be collected to form a long-term SNR statistic in the sensor node S1. Based on this statistic, the decision threshold THR can be set so that the sensor node S1 only transmits if the current SNR value is above the long-term average SNR value.

In the proposed multiple access scheme, the number of available, randomly selectable antenna beams formed by the controller C is preferably larger than the number of sensors S1, S2, . . . SK in the WSN. This reduces the likelihood that various sensor nodes will monitor similar channel properties and thus simultaneously decide for favorable channel conditions, which would lead to simultaneous message transfers and collisions. If the number of beams is limited to a smaller number, the proposed scheme can be combined with well-known conventional multiple access techniques to coordinate the simultaneous transmission of sensor nodes seeing a channel with sufficient channel conditions. For instance, a simplified carrier-sense mechanism with random backoff might be used in the UPLINK TRANSMISSION phase to reduce the number of collisions, and the exchange of RTS/CTS frames between sensor S1 and control node C before sensor message transmission in order to combat the hidden terminal problem. The RTS/CTS mechanism is used to reduce interruptions from other stations during a transmission from a source to a destination. The source sends a Request To Send (RTS) to the destination. The latter answers with a Clear To Send (CTS). RTS (respectively CTS) notifies the stations in the neighborhood of the source (respectively in the neighborhood of the destination) that a transmission will take place and that they should delay their own transmission during the amount of time indicated in the RTS (respectively CTS). Other solutions that allow simultaneous transmission of multiple nodes, e.g. Code Division Multiple Access, might also be envisaged.

The basic scheme presented above might be extended by applying some well-known wireless protocol and transceiver concepts. For example, a third phase might follow the UPLINK TRANSMISSION phase in order to acknowledge the successful message reception. Additionally, the WSN controller C could perform channel estimation on the UPLINK TRANSMISSION and use this information to adapt the drawing statistics of the antenna coefficients w1, w2, . . . wM accordingly.

Theoretical Foundation

This section describes the mathematical foundation of the proposed multiple-access technique. First, the system model will be introduced, then a formal description of the operations taking place during the DOWNLINK-BROADCAST phase is given, and finally the decision threshold THR for the statistics of a particular radio channel model will be derived that is also applied for the design of radio receivers and investigations of channel fading effects on the receiver performance.

System Model

An illustration of the system model is depicted in FIG. 3. The baseband representation of the signal received from sensor node k at the WSN controller C is given by:

$$i. y_k = \sqrt{\epsilon_s} h_k s_k + n_k, \qquad (1)$$

where k=1, . . . K, where the above used sensor indicators S1, . . . SK are replaced by 1 . . . K, and where the vectors $y_k$, $h_k$, and $n_k$ are given by:

$$y_k = \begin{bmatrix} y_{k,1} \\ y_{k,2} \\ M \\ y_{k,M} \end{bmatrix}, \quad h_k = \begin{bmatrix} h_{k,1} \\ h_{k,2} \\ M \\ h_{k,M} \end{bmatrix}, \quad \text{and } n_k = \begin{bmatrix} n_{k,1} \\ n_{k,2} \\ M \\ n_{k,M} \end{bmatrix} \qquad (2)$$

The scalars $y_{k,m}$ where m=1, . . . M denote the sensor signal sent by the kth sensor node k and received by the controller C on the mth antenna CAm. The indices in the channel coefficients $h_{k,m}$ where m=1, ... M and in the noise terms $n_{k,m}$ where m=1, ... M can be interpreted in a similar fashion. The transmitted energy is denoted by $\epsilon_s$, and $s_k$ is the transmitted symbol drawn from an unit-energy modulation constellation. The noise is assumed to be white and complex Gaussian distributed, i.e. $n_{k,m} \sim CN(0,N_0)$ and $\epsilon\{n_{k,m} n_{k,n}^*\} = N_0 \delta(m-n)$. The channel coefficients $h_{k,m}$ can be modeled in several ways depending on the radio propagation environment. In order to derive the decision threshold THR, a Rayleigh slow-fading channel model is assumed. The channel coefficients $h_{k,m}$ are thus modeled as independent complex Gaussian coefficients, i.e. CN (0,1), and the coherence time of the channel is assumed to be large enough to consider the channel characteristics of the down- and uplink as equal. Under these assumptions, the magnitude squared of the channel coefficients follows a chi-square distribution. The cumulative distribution function (CDF) and the probability density function (PDF) of a $X_{2m}^2$ random variable are given by:

$$F_{x_{2m}^2}(x) = 1 - e^{-x} \sum_{k=0}^{m-1} \frac{x^k}{k!} \quad (3)$$

$$f_{x_{2m}^2}(x) = \frac{\partial}{\partial x} F_{x_{2m}^2}(x) = \frac{e^{-x} x^{m-1}}{(m-1)!} \text{ for } x \geq 0 \quad (4)$$

Upon reception of the kth sensor signal $y_k$, the controller C weighs the output signal from all antennas CA1, ... CAM and adds them up. This operation can be expressed by the following inner product:

$$r_k = w_k^H y_k = \sqrt{\epsilon_s} \cdot w_k^H h_k s_k + w_k^H n_k \quad (5)$$

where $w_k^H$ = weight vector.

The output $r_k$ of this combiner is a scalar. In order to increase the post-processing SNR, the weights are chosen such that $w_k = h_k$. A sufficient statistic is then obtained as:

$$r_k = \sqrt{\epsilon_s} \|h_k\|^2 s_k + h_k^H n_k \quad (6)$$

This weighting is known as Maximum Ratio Combining (MRC) and yields the received SNR $$\rho_k = \frac{\epsilon_s}{N_0} \cdot \|h_k\|^2.$$

Normally, in this technique the receiving sensor uses precise channel knowledge. The resulting overhead for channel estimation is usually prohibitive in a wireless sensor network. However, the proposed opportunistic scheme according to the invention achieves under some constraints, which are explained in the following, the MRC performance on the uplink without any channel knowledge.

The Downlink Broadcast Phase

During the DOWNLINK-BROADCAST phase, the WSN controller C forms the antenna beam by choosing the weights w randomly according to:

$$w = \sqrt{\frac{M}{\|g\|^2}} g \quad (7)$$

where $g_m \sim h_{k,m}$, $\forall k$, m=1, ... M, and
where $g_m \sim h_{k,m}$ means that $g_m$ and $h_{k,m}$ are identically distributed.

The coefficients $g_m$, m=1, ... M are identically distributed as the channel coefficients, and the normalization term ensures that the power constraint $w^H w = M$ is satisfied. The weights w are chosen independently of a particular sensor node. Once the transmission weights w are chosen, the controller C uses them to broadcast the beacon signal. At the next DOWNLINK-BROADCAST phase, new antenna coefficients w1, ... wM will be drawn.

Because it is a continuous distribution, a practical scheme quantizes the distribution in equation (7). Let L denote the number of quantization levels. Due to the vectorial character of the distribution, the weight distribution is quantized on an antenna basis. Thus, the total number of beams to be visited is $N=L^M$. The beams are visited randomly according to a discrete probability distribution function.

If the weights match the channel of sensor node k in the MRC sense, the SNR $\rho_k^B$ at the sensor node covered by the beam will be:

$$\rho_k^B = \frac{\epsilon_s}{N_0} \sum_{m=1}^{M} |h_{k,m}|^2 = \frac{\epsilon_s}{N_0} \|h_k\|^2 \quad (8)$$

If the number of sensor nodes K is high enough, then, with a sufficient probability, there will be at least one sensor node that matches the weights or is sufficiently close to match them and will receive the signal with the SNR given by equation (8).

This result has been presented in the above mentioned paper of R. Laroia et al, where after the broadcast phase, all the mobile users in a cellular network feed back to the controller their estimated SNR. According to the set of SNRs, the controller schedules the strongest user for transmission. Using this scheme, the referred work shows that asymptotically in the number of users, the transmission to a user is scheduled when the weights $w = h_k$, i.e. the user is in beam-forming configuration. Transmitting at that moment is advantageous in an information-theoretic sense. The achievable rates are improved and the gains increase with the number of users.

In contrast thereto in the invention no information is fed back to the controller. The sensor nodes determine by themselves whether to transmit or not. In fact, in a probabilistic sense, they estimate how well they are covered by the controller's antenna beam based on their own SNR measurement performed during the downlink broadcasting phase. Therefore, the sensors will transmit in case they conclude to be substantially under the beam.

SNR Statistics

As the decision of whether to transmit or not is done based on the SNR observed by each sensor node, it is of interest to analyze its statistics. Using equation (7), the SNR $\rho_k$ of the received beacon signal in the sensor node can be written as a quadratic form and its general distribution can then be readily obtained.

$$\rho_k = \frac{\epsilon_s}{MN_0} h_k^H w \quad (9)$$

$$= \frac{\epsilon_s}{N_0 \|g\|^2} (h_k^H g)^2$$

$$= \frac{\epsilon_s}{N_0 \|g\|^2} h_k^H g g^H h_k$$

-continued $$= \frac{\varepsilon_s}{N_0 \|g\|^2} h_k^H U \Lambda U^H h_k$$

$$= \frac{\varepsilon_s}{N_0 \|g\|^2} \sum_{m=0}^{M} |Uh_k|_m^2 \lambda_m(gg^H)$$

$$= \frac{\varepsilon_s}{N_0} |\tilde{h}_{k,m}|^2 \sim \frac{\varepsilon_s}{N_0} x_2^2$$

where the eigenvalue decomposition of the rank-deficient matrix $gg^H$, the fact that its unique non-zero eigenvalue equals $\|g\|^2$, and that $\tilde{h}_k = Uh_k$ is equally distributed as $h_k$ is used.

On the other hand, the best SNR value is obtained when the transmit weights match the channel coefficients $h_k$ as indicated in equation (8). In this case, the SNR distribution is given by $$\rho_k \sim \frac{\varepsilon_s}{N_C} x_{2M}^2 \qquad (10)$$

The two results on the distribution of the SNR can be used to obtain the following conditional distributions: Let $A_k$ (respectively, $\overline{A}_k$) denote the event that the sensor k is covered by the antenna beam (respectively, the sensor k is not covered). Then, the distribution of the SNR $\rho_k$ conditioned on the event $A_k$ is given by:

$$f(\rho_k \mid A_k) = \frac{1}{\rho} f_{x_{2M}^2}(\rho_k / \rho) \qquad (11)$$

$$= \frac{1}{\rho} \frac{e^{-\rho_k/\rho}(\rho_k/\rho)^{M-1}}{(M-1)!}$$

where $\rho$ denotes the pre-processing SNR $\varepsilon_s/N_0$. Similarly, the distribution of the SNR $\rho_k$ conditioned on the complementary event $\overline{A}_k$ is:

$$f(\rho_k \mid \overline{A}_k) = \frac{1}{\rho} f_{x_2^2}(\rho_k / \rho) \qquad (12)$$

$$= \frac{1}{\rho} e^{-\rho_k/\rho}$$

These two conditional distributions $f(\rho_k|A_k)$ and $f(\rho_k|\overline{A}_k)$ will now be exploited to derive a rule that can be implemented in the sensor to detect whether it is covered by the beam or not.

To Transmit or not to Transmit

Hereafter, a method is proposed which allows the sensor to detect based on the observed SNR $\rho_k$ whether the event $A_k$ is true or false. One can say that $A_k$ happens when the weight vector w is such that:

$$w \in \left[ \sqrt{\frac{M}{\|h_k\|^2}} h_k - \gamma, \sqrt{\frac{M}{\|h_k\|^2}} h_k + \gamma \right] \qquad (13)$$

where $\gamma$ is sufficiently small. This $\gamma$-approximation is necessary due to the continuous character of the considered distributions. The Maximum A Posteriori (MAP) decision rule is formed as follows:

$$Pr(A_k) f(\rho_k \mid A_k) \underset{\overline{A}_k}{\overset{A_k}{\gtrless}} Pr(\overline{A}_k) f(\rho_k \mid \overline{A}_k) \qquad (14)$$

The Maximum Likelihood rule is obtained for equal a priori probabilities. Using equations (11), and (12), and the Chi-square density function equation (3), the decision rule is obtained:

$$\alpha \frac{(\rho_k/\rho)^{M-1}}{(M-1)!} \underset{\overline{A}_k}{\overset{A_k}{\gtrless}} 1 \Longleftrightarrow \rho_k \underset{\overline{A}_k}{\overset{A_k}{\gtrless}} \exp\left( \frac{\sum_{i=1}^{M-1} \log i - \log \alpha}{(M-1)} + \log \rho \right) \qquad (15)$$

for detecting the event beam-coverage in the sensor k. The decision threshold depends on the number M of antennas CA at the controller C, on the a priori probabilities of both events contained in $\alpha = PR(A_k)/Pr(\overline{A}_k)$, and on the pre-processing SNR $\rho$.

Any disclosed embodiment may be combined with one or several of the other embodiments shown and/or described. This is also possible for one or more features of the embodiments. Having illustrated and described an advantageous embodiments for novel methods and apparatus, it is noted that variations and modifications in the method and the apparatus can be made without departing from the spirit of the invention or the scope of the appended claims.

The present invention can be realized in hardware, software, or a combination of hardware and software. It may be implemented as a method having steps to implement one or more functions of the invention, and/or it may be implemented as an apparatus having components and/or means to implement one or more steps of a method of the invention described above and/or known to those skilled in the art. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods. Methods of this invention may be implemented by an apparatus which provides the functions carrying out the steps of the methods. Apparatus and/or systems of this invention may be implemented by a method that includes steps to produce the functions of the apparatus and/or systems.

Computer program means or computer program in the present context include any expression, in any language, code or notation, of a set of instructions intended to cause a system having an information processing capability to perform a particular function either directly or after conversion to another language, code or notation, and/or after reproduction in a different material form.

Thus the invention includes an article of manufacture which comprises a computer usable medium having computer readable program code means embodied therein for causing one or more functions described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed, is:

1. A controller method for a controller device in wireless communication with a plurality of low power sensor devices, the controller device comprising a plurality of omni-directional antennae, the method comprising:
   a) the controller device utilizing the plurality of omni-directional antennae to direct transmission of a beacon signal in a predetermined direction to solicit a sensor signal from sensor devices located in the predetermined direction, wherein the controller device determines each predetermined direction by multiplying the signal transmitted at each antennae by a corresponding weight or complex coefficient calculated for each antennae of the plurality of omni-directional antennae;
   b) subsequent to said directed transmission, the controller device listening, for a predetermined listening period, for a sensor signal from a sensor device located in the predetermined direction;
   c) responsive to receiving the sensor signal, if any, during said predetermined listening period, receiving sensor information from said sensor device;
   d) subsequent to said predetermined listening period, determining a new predetermined direction; and
   e) repeating steps a) through e).

2. The method according to claim 1, wherein said controller device resolves multiple sensor signals received at one time from multiple sensor devices.

3. The method according to claim 1, wherein the determining the new predetermined direction consists of selecting a random direction.

4. A controller device in wireless communication with a plurality of low power sensor devices, the controller device comprising:
   an plurality of omni-directional antennae for directionally transmitting/receiving wireless signals;
   and a control circuit in communication with said plurality of omni-directional antennae, wherein the controller device performs a method comprising:
   a) the controller device utilizing the plurality of omni-directional antennae to direct transmission of a beacon signal in a predetermined direction to solicit a sensor signal from sensor devices located in the predetermined direction, wherein the controller device determines each predetermined direction by multiplying the signal transmitted at each antennae by a corresponding weight or complex coefficient calculated for each antennae of the plurality of omni-directional antennae;
   b) subsequent to said directed transmission, the controller device listening, for a predetermined listening period, for a sensor signal from a sensor device located in the predetermined direction;
   c) responsive to receiving the sensor signal, if any, during said predetermined listening period, receiving sensor information from said sensor device;
   d) subsequent to said predetermined listening period, determining a new predetermined direction; and
   e) repeating steps a) through e).

5. The controller device according to claim 4, wherein said controller device resolves multiple sensor signals received at one time from multiple sensor devices.

6. The controller device according to claim 4, wherein the determining the new predetermined direction consists of selecting a random direction.

7. A computer program product for a controller device in wireless communication with a plurality of low power sensor devices, the controller device comprising a plurality of omni-directional antennae, the computer program product comprising:
   a storage medium readable by a processing circuit and storing instructions for execution by the processing circuit for performing a method comprising:
   a) the controller device utilizing the plurality of omni-directional antennae to direct transmission of a beacon signal in a predetermined direction to solicit a sensor signal from sensor devices located in the predetermined direction, wherein the controller device determines each predetermined direction by multiplying the signal transmitted at each antennae by a corresponding weight or complex coefficient calculated for each antennae of the plurality of omni-directional antennae;
   b) subsequent to said directed transmission, the controller device listening, for a predetermined listening period, for a sensor signal from a sensor device located in the predetermined direction;
   c) responsive to receiving the sensor signal, if any, during said predetermined listening period, receiving sensor information from said sensor device;
   d) subsequent to said predetermined listening period, determining a new predetermined direction; and
   e) repeating steps a) through e).

8. The computer program product according to claim 7, wherein said controller device resolves multiple sensor signals received at one time from multiple sensor devices.

9. The computer program product method according to claim 7, wherein the determining the new predetermined direction consists of selecting a random direction.

10. The method according to claim 1, further comprising:
the sensor device gathering sensed data;
the sensor device determining that a received first beacon signal is not directed to said sensor, the determination based on strength of a received second beacon signal not exceeding the predetermined threshold value;
the sensor device determining that the received second beacon signal is directed to said sensor, the determination based on strength of the received second beacon signal exceeding the predetermined threshold value; and
immediately after receiving the second beacon signal, the sensor device transmitting sensor information to said controller, said sensor information comprising said gathered sensed data.

11. The controller device according to claim 4, further comprising:
the sensor device gathering sensed data;
the sensor device determining that a received first beacon signal is not directed to said sensor, the determination based on strength of a received second beacon signal not exceeding the predetermined threshold value;
the sensor device determining that the received second beacon signal is directed to said sensor, the determination based on strength of the received second beacon signal exceeding the predetermined threshold value; and
immediately after receiving the second beacon signal, the sensor device transmitting sensor information to said controller, said sensor information comprising said gathered sensed data.

12. The computer program product according to claim 7, further comprising:
the sensor device gathering sensed data;
the sensor device determining that a received first beacon signal is not directed to said sensor, the determination based on strength of a received second beacon signal not exceeding the predetermined threshold value;
the sensor device determining that the received second beacon signal is directed to said sensor, the determination based on strength of the received second beacon signal exceeding the predetermined threshold value; and
immediately after receiving the second beacon signal, the sensor device transmitting sensor information to said controller, said sensor information comprising said gathered sensed data.

* * * * *